United States Patent
Devinney et al.

(10) Patent No.: US 11,629,795 B2
(45) Date of Patent: Apr. 18, 2023

(54) PUMP, MULTI-FUNCTION VALVE, AND CONTROLLER APPARATUS

(71) Applicant: PumpOne Environmental, LLC, Cornelius, NC (US)

(72) Inventors: Kerry Shawn Devinney, Cornelius, NC (US); Douglas John Blew, Mooresville, NC (US)

(73) Assignee: PumpOne Environmental, LLC, Cornelius, NC (US)

( * ) Notice: Subject to any disclaimer, the term of this patent is extended or adjusted under 35 U.S.C. 154(b) by 266 days.

(21) Appl. No.: 17/157,280

(22) Filed: Jan. 25, 2021

(65) Prior Publication Data

US 2021/0230968 A1 Jul. 29, 2021

Related U.S. Application Data

(60) Provisional application No. 62/965,377, filed on Jan. 24, 2020.

(51) Int. Cl.

| | |
|---|---|
| F04F 1/06 | (2006.01) |
| F16K 31/122 | (2006.01) |
| F16K 15/04 | (2006.01) |
| F16K 11/07 | (2006.01) |
| F04B 49/04 | (2006.01) |
| F04B 49/06 | (2006.01) |
| F04B 49/22 | (2006.01) |

(52) U.S. Cl.
CPC ............ *F16K 31/1221* (2013.01); *F04F 1/06* (2013.01); *F16K 11/0716* (2013.01); *F16K 15/044* (2013.01); *F04B 49/04* (2013.01); *F04B 49/06* (2013.01); *F04B 49/22* (2013.01)

(58) Field of Classification Search
CPC ...... F04F 1/06–12; F04B 49/025; F04B 49/04
See application file for complete search history.

(56) References Cited

U.S. PATENT DOCUMENTS

| | | | |
|---|---|---|---|
| 1,092,382 A | 4/1914 | Ness | |
| 1,835,086 A * | 12/1931 | Rogers | F04F 1/06 417/127 |
| 5,161,956 A * | 11/1992 | Fiedler | E21B 43/121 417/86 |
| 5,183,391 A * | 2/1993 | Fiedler | F04F 1/08 417/86 |
| 5,358,037 A | 10/1994 | Edwards et al. | |
| 5,373,897 A * | 12/1994 | Skarvan | E21B 43/40 166/250.03 |

(Continued)

*Primary Examiner* — Thomas Fink
(74) *Attorney, Agent, or Firm* — Trego, Hines & Ladenheim, PLLC; Brandon C. Trego

(57) ABSTRACT

A pump assembly is disclosed. The pump assembly including a pump having an outer casing having a first end, an opposing second end, and a cavity therein and a multi-function valve connected to the first end of the pump. The pump further including a discharge tube positioned in the cavity and exiting the first end of the outer casing; a check valve positioned in the cavity and operably connected to the discharge tube by a coupling; and a multi-float control assembly positioned in the cavity, the multi float control assembly including a bottom float check valve operably connected to the discharge tube by the coupling and an upper float check valve connected to a vent exiting the first end of the outer casing.

18 Claims, 9 Drawing Sheets

(56) References Cited

U.S. PATENT DOCUMENTS

| | | | |
|---|---|---|---|
| 5,470,206 A * | 11/1995 | Breslin | F04F 1/08 |
| | | | 417/131 |
| 6,095,759 A | 8/2000 | Breslin | |
| 6,220,823 B1 | 4/2001 | Newcomer | |
| 6,234,761 B1 | 5/2001 | Kocsis et al. | |
| 7,316,544 B2 | 1/2008 | Vidrine | |
| 2017/0321724 A1* | 11/2017 | Breslin | F04F 1/08 |
| 2018/0313369 A1* | 11/2018 | Breslin | F04F 1/08 |
| 2019/0113040 A1* | 4/2019 | Wendland | F04F 1/08 |
| 2019/0199109 A1* | 6/2019 | Oh | B60R 16/03 |
| 2020/0263706 A1* | 8/2020 | Wells | F04F 1/06 |
| 2021/0115768 A1* | 4/2021 | Schaupp | F04F 1/08 |

* cited by examiner

PUMP, MULTI-FUNCTION VALVE, AND CONTROLLER APPARATUS

BACKGROUND OF THE INVENTION

This invention relates generally to a pump, multi-function valve, and controller apparatus.

Well pumps are employed within and around landfills in order to remove leachate and "dewater" the ground water and area within and/or surrounding solid waste landfills. The original source of this water can be from rain falling onto the landfill surface area, surface water flowing into the landfill boundary, or from sub-surface water that flows via a gradient into the landfill boundary. Dewatering the landfill area is done for a variety of reasons: (1) in unlined or failed-lining landfills, the pumps help to prevent the flow of undesirable leachate from leaving the landfill boundary and contaminating the surrounding water table; (2) in lined landfills, a build-up of leachate places undue pressure on the landfill lining and may lessen the integrity of the lining over time; and (3) in many landfills, methane gas is extracted from wells and sold and/or utilized as a fuel source. In order for these wells to function optimally, the level of leachate within the well bore needs to be lowered and kept to a minimum to increase the effective area of methane extraction from within the well.

Well pumps for the above purpose are available from a variety of manufacturers and widely deployed across the global landfill infrastructure. Pumps are generally powered by compressed air or electricity (electric motor-driven pump). The preference for which pump type is deployed normally is dictated by the type of utility services a landfill has in place and distributed around the property—which sometimes cover extremely large land areas. In the cases where compressed air is employed, a pump chamber, located at depth within a well, fills with leachate and then is pumped to the surface and into storage tanks solely via compressed air. Electric pumps contain leachate-level sensors which turn the pump on and off to pump the well down as required.

Air operated pumps come in many different forms. For example, one form of air-operated pump relies on intricate floats, linkages and valving to automatically affect a repetitive fill/discharge/fill . . . cycle of the pump. These actuation elements must be finely tuned and balanced in order to operate in the challenging and varied down-hole environments which are often corrosive, contain particulates/and/or sludge and are at elevated temperatures. The combination of these factors contributes to pump failures after short periods of operation and requires the pump to be pulled from the well and be serviced.

Other forms of air-operated pumps are controlled by remote valves and timing circuits located at ground level above the operating depth of the well pump. The prior-art hardware and control schemes of these pumps have been proven unreliable and often fail in short order due to contamination. The failures result because commercial off the shelf air valves have been employed and configured for an environment they are not capable of operating in for extended periods of time. In particular, the exhaust component of the prior-art pumps must be returned to the surface and processed through a valve which is often through the same valve and supply line that provides the compressed air down the well to the pump. It is the dual use of these lines and valves for air supply and contaminated pump exhaust that introduces the source of contamination into the operating hardware.

Accordingly, there is a need for a pump, multi-function valve, and controller capable of improving reliability.

BRIEF SUMMARY OF THE INVENTION

This need is addressed by the present invention, which provides a pump, a multi-function valve, and controller that prevent contamination of supply lines and provide reliable operation.

According to one aspect of the invention, a pump assembly includes a pump having an outer casing having a first end, an opposing second end, and a cavity therein, the pump further including: a discharge tube positioned in the cavity and exiting the first end of the outer casing; a check valve positioned in the cavity and operably connected to the discharge tube by a coupling; and a multi-float control assembly positioned in the cavity, the multi float control assembly including a bottom float check valve operably connected to the discharge tube by the coupling and an upper float check valve connected to a vent exiting the first end of the outer casing; and a multi-function valve connected to the first end of the pump.

According to another aspect of the invention, a pump assembly including a pump having an outer casing having a first end, an opposing second end, and a cavity therein, the pump further including: a discharge tube positioned in the cavity and exiting the first end of the outer casing; a check valve positioned in the cavity and operably connected to the discharge tube by a coupling; and a multi-float control assembly positioned in the cavity, the multi float control assembly including a bottom float check valve operably connected to the discharge tube by the coupling and an upper float check valve connected to a vent exiting the first end of the outer casing; and a controller apparatus connected to the pump, the controller apparatus operating the pump under a pre-determined control scheme.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 2:
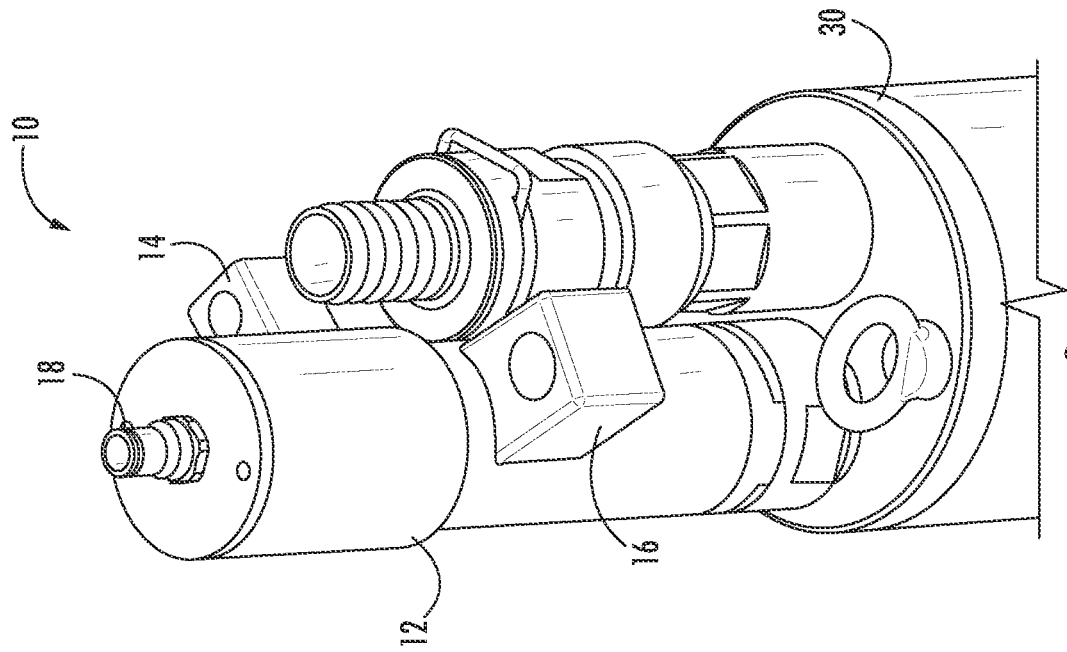
FIG. 2 is a perspective view of the multi-function valve of FIG. 1.
Figure 1:
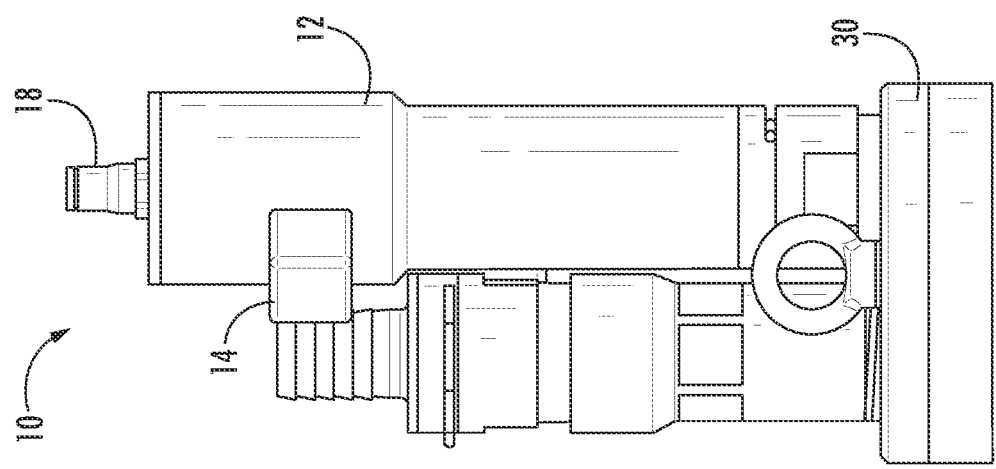
FIG. 1 is a side elevation view of a multi-function valve according to an embodiment of the invention connected to an air operated pump.
Figure 3:
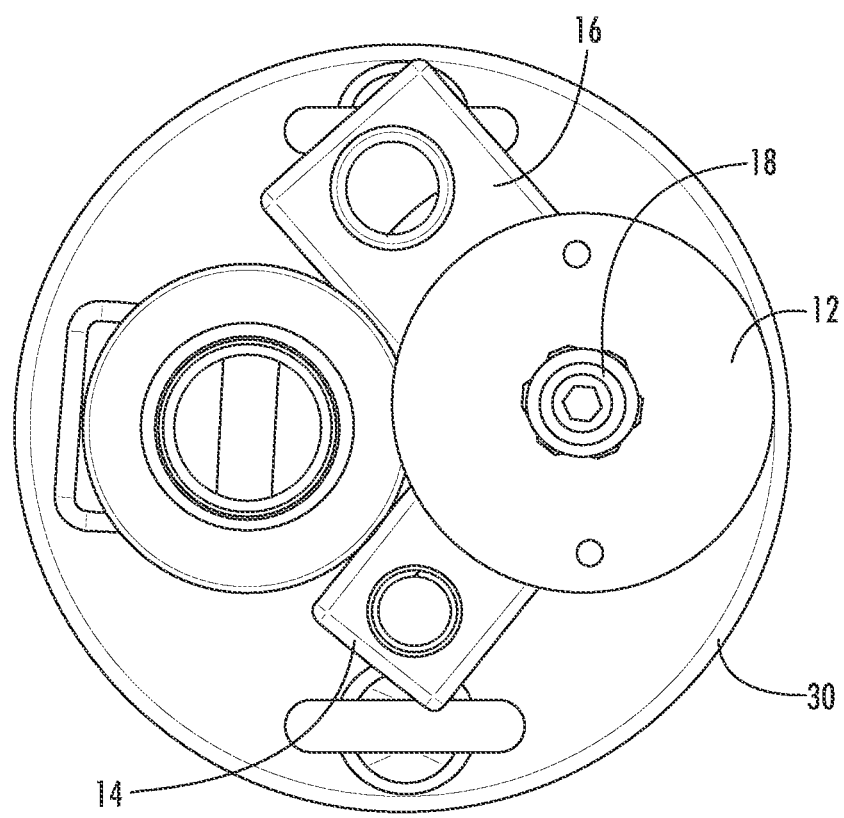
FIG. 3 is a top view of the multi-function valve of FIG. 1.

Referring to the drawings wherein identical reference numerals denote the same elements throughout the various views, FIGS. 1-3 illustrate an exemplary multi-function valve 10. The valve 10 includes a housing 12, a compressed supply air inlet 14 connected to the housing 12, a vent 16 connected to the housing 12, and a compressed pilot air inlet 18 connected to the housing 12.

Figure 4:
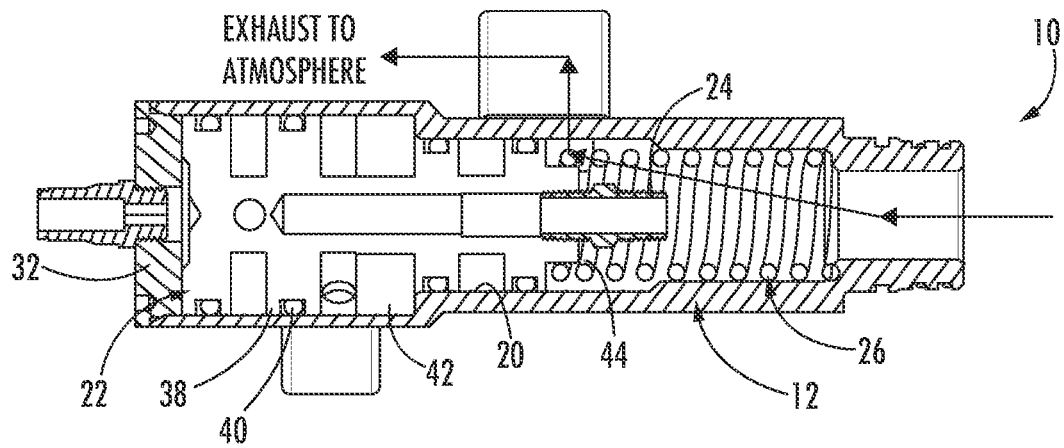
FIG. 4 is a cross-sectional view of the multi-function valve of FIG. 1 in a normally open state.
Figure 5:
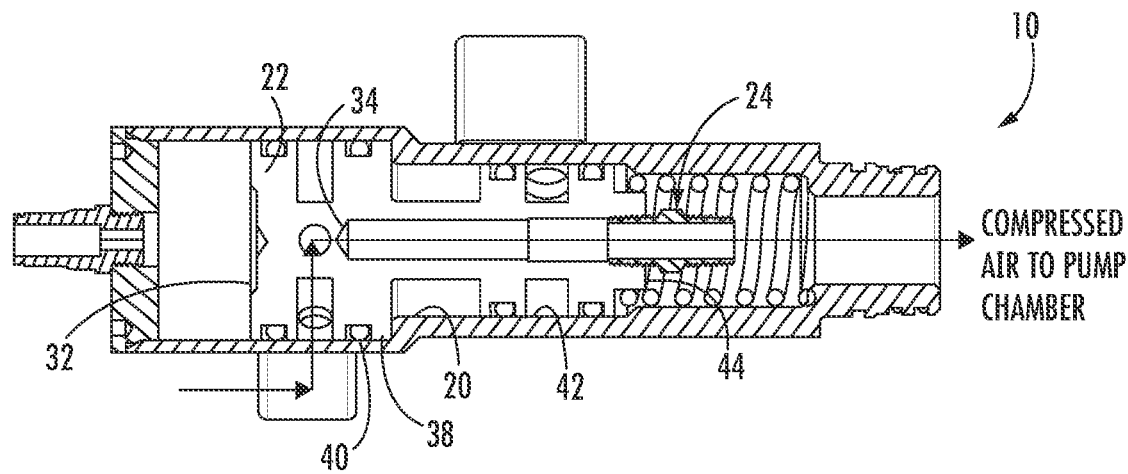
FIG. 5 is a cross-sectional view of the multi-function valve of FIG. 1 in an actuated state.

As shown in FIGS. 4 and 5, the housing 12 includes an internal bore 20 which contains a spool valve 22 having a check valve 24 and a spring 26 operably connected to the spool valve to bias the spool valve 22 in a normally open exhausting position. The spool valve 22 both seals and directs a flow of compressed air and exhaust, while at the same time provides a piston surface that is sufficient to actuate the spool valve 22 when pilot air is supplied to the valve 10. The spring 26 is of sufficient spring rate to move the spool valve 22 to a normally off position when pilot air is removed from a piston end 32 of the spool valve 22. Check valve 24 prevents nuisance contamination from entering the upper reaches of the spool valve 22 through a compressed air exit 34 of the spool valve 22.

The multi-function valve 10 improves the reliability and operating deficiency of compressed air-operated landfill well pumps. As illustrated in FIGS. 1-3, the multi-function valve is mounted on, atop or within a pump 30, which is then subsequently lowered into a bored well to the required operating depth. In general, the function of the valve 10 is to, upon remote command, supply compressed air to the pump cavity, which forces enclosed leachate up and out of the pump 30 to be collected on the surface and to also, upon remote command, exhaust any spent compressed air to the surface (atmosphere) once a pump emptying cycle has been completed. Compressed air supply and exhaust functions of the multi-function valve 10 are controlled from the surface (ground level) via a single isolated pilot-air supply line connected to the pilot air inlet 18 which maintains near instrument air quality cleanliness and is not subject to contamination from the operating environment of the pump 30.

The multi-function valve 10 provides a single connection to the pump 30 for compressed air charging and exhaust which reduces the complexity, amount of external connections and allows for a single "quick connect/disconnect" arrangement whereby the entire multi-function valve 10 can be easily installed and/or removed from the pump 30. It should be appreciated that pump 30 may be any suitable air operated well pump for pumping leachate from a well. For example, pump 30 may be a pump like that shown in FIGS. 6-8 or may include a single float around the discharge tube with a mechanical control rod assembly.

In general, the multi-function valve 10 operates as follows. In an "off" or normally open exhaust state (FIG. 4), exhaust air from the pump 30 is free to flow into an open end 36 of the multi-function valve 10, through the spring 26 within the bore 20, out through the vent 16, and vented to the atmosphere via a line connected to the vent 16. While the spool valve 22 is in the normally open position, the compressed air, which is required to charge the pump 30, is connectedly closed off and prevented from entering the pump 30 via sealing surfaces 38 of the spool valve 22. As shown, seals 40, such as O-rings may be used to help seal the spool valve 22 along an inner surface 42 of the bore 20.

While in an exhaust state, if leachate is present external to the pump 30, the leachate liquid is free to flow into the pump 30 via an open float valve at a bottom of the pump 30. The leachate will fill the pump cavity until one of the following occurs: the leachate level exterior to the pump 30 balances with a level internal to the pump 30 or a timer of the pump 30 causes the accumulated leachate to be expelled. It is also in this state where check valve 24 installed at an anterior end 44 of the spool valve 22 and also seals 40 prohibit any contamination from entering into the upper reaches of the spool valve 22. It should be clear from the figures that there are multiple or redundant seals and/or barriers to prevent contamination between distinct flow areas within the multi-function valve 10.

In an "on" or actuated state, pilot air is supplied from a control system located at ground level to the piston end 32 of the spool valve 22. This pilot air pressure, in combination with the surface area of the piston end 32 of the spool valve 22 is sufficient to overcome the force of the spring 26 and move the spool valve 22 to its actuated position. In the actuated state, the spool valve 22 and sealing elements 38, 40 block off and isolate the vent 16 while simultaneously and connectedly opening the compressed air supply inlet 14 to the pump 30. This allows compressed air to flow from the compressed air supply inlet 14, though the bore 20 in the multi-function valve housing 12, through a center flow passage of the spool valve 22, past the check valve 24 and exit the valve housing 12 into the pump cavity. This compressed air sufficiently increases the pressure within the pump cavity to force a float valve at the bottom of the pump 30 closed and then eject any liquid leachate contained within the pump 30 out of the pump 30 and to the surface where it is collected.

This "shuttling" of the spool valve 22 within the valve housing 12 is repeated at a rate sufficient enough to allow time for the pump cavity to fill, be emptied and then filled again. It is often desirable for operators of landfills to slow down or throttle their pumps to flow rates lower than they are optimally capable in order to not over tax their storage and other infrastructure or to unnecessarily cycle them in a "dry" state. A simple air-operated (no electrical power required) timing circuit that is located at ground level and can be easily adjusted to control the amount of fill and discharge time, hence flow rate may be used for in conjunction with the multi-function valve 10 to accomplish this.

As illustrated, the area of the piston end 32 of the spool valve 22 where the pilot air actuates the valve 10 is greater than the area of the opposing or opposite end of the spool valve 22 which is connectedly open to the pump cavity. This is purposely designed such that the pilot air supplied to the piston end 32 of the spool valve 22 generates a sufficiently overcoming force to counteract the sum of the spring return force plus the compressed air pressure built up while charging the pump 30 acting over the open and exposed area of the spool valve 22 which opposes the pilot actuated piston end 32 of the spool valve 22. If this were not taken into account, the spool valve 22 would prematurely be moved from its commanded position of charging the pump 30 with compressed air to that of an exhausting or stalled position. This situation would prevent the pump 30 from operating in a normal deterministic manner, resulting in no or inconsistent operation.

Figure 6:
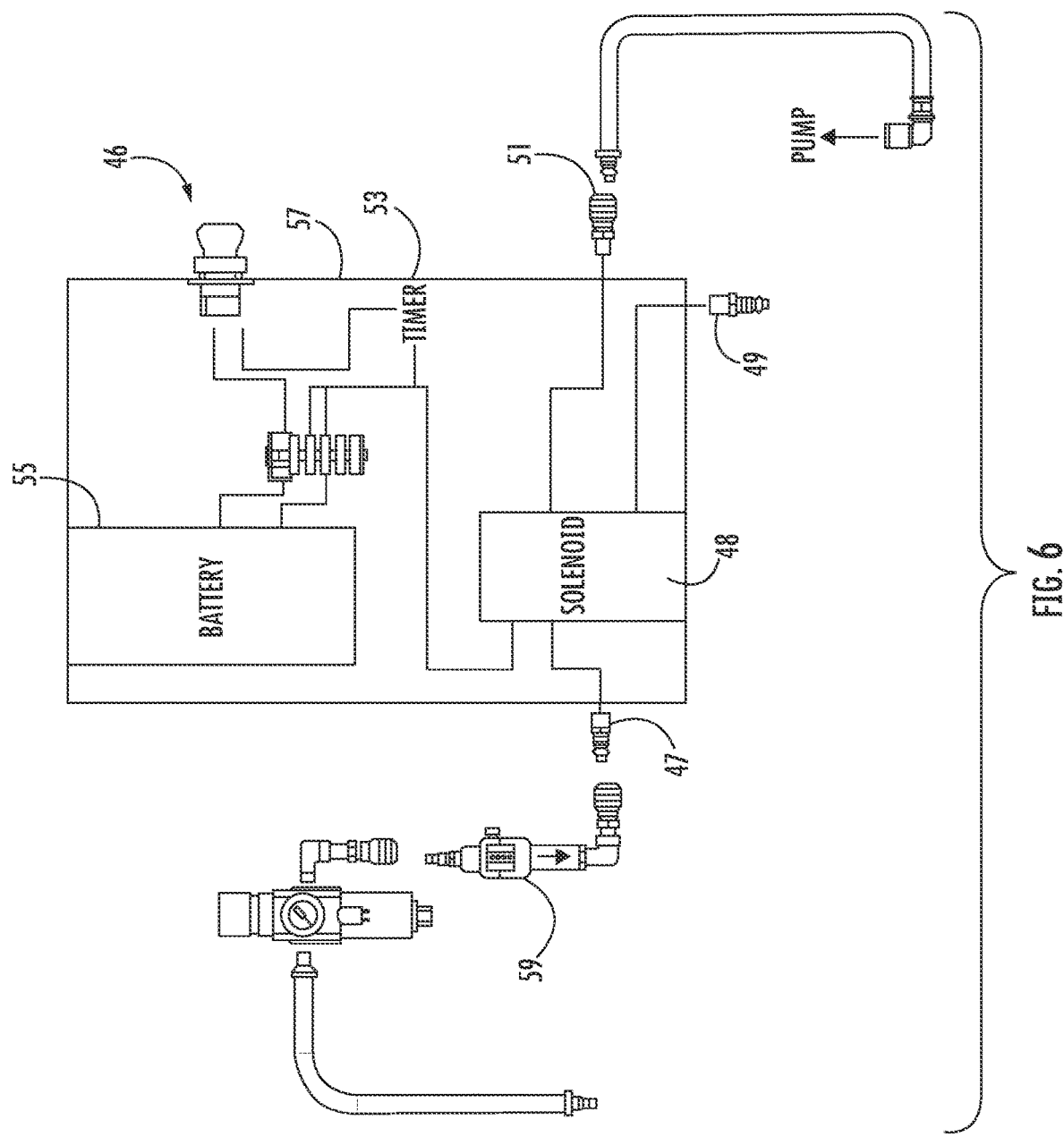
FIG. 6 is a controller apparatus for use with a pump and/or the multi-function valve of FIG. 1.

Referring to FIG. 6, a controller apparatus 46 may be used in combination with the multi-function valve 10 or without. The controller apparatus 46 includes an air input 47 connected to a solenoid 48, an exhaust 49 and air output 51 connected to the solenoid 48, a timer 53, and a battery 55 contained in a case and/or cabinet 57. The controller apparatus 46 operates the pump 30 under a pre-determined control scheme by controlling compressed air supply and exhaust functions of the pump 30 and/or multi-function valve 10. As stated above, the controller apparatus 46 provides for control of the pump 30 without the use of the multi-function valve 10.

As shown, the air input 47 is connected to a supply of air via a counter 59 and through the use of the solenoid 48 can supply air to the pump 30. Likewise, an exhaust of the pump is connected to the solenoid 48. The timer 53 is used to set the pre-determined control scheme by turning the solenoid 48 on and off at pre-determined times and the battery 55 provides power to the controller apparatus 46.

Figure 7:
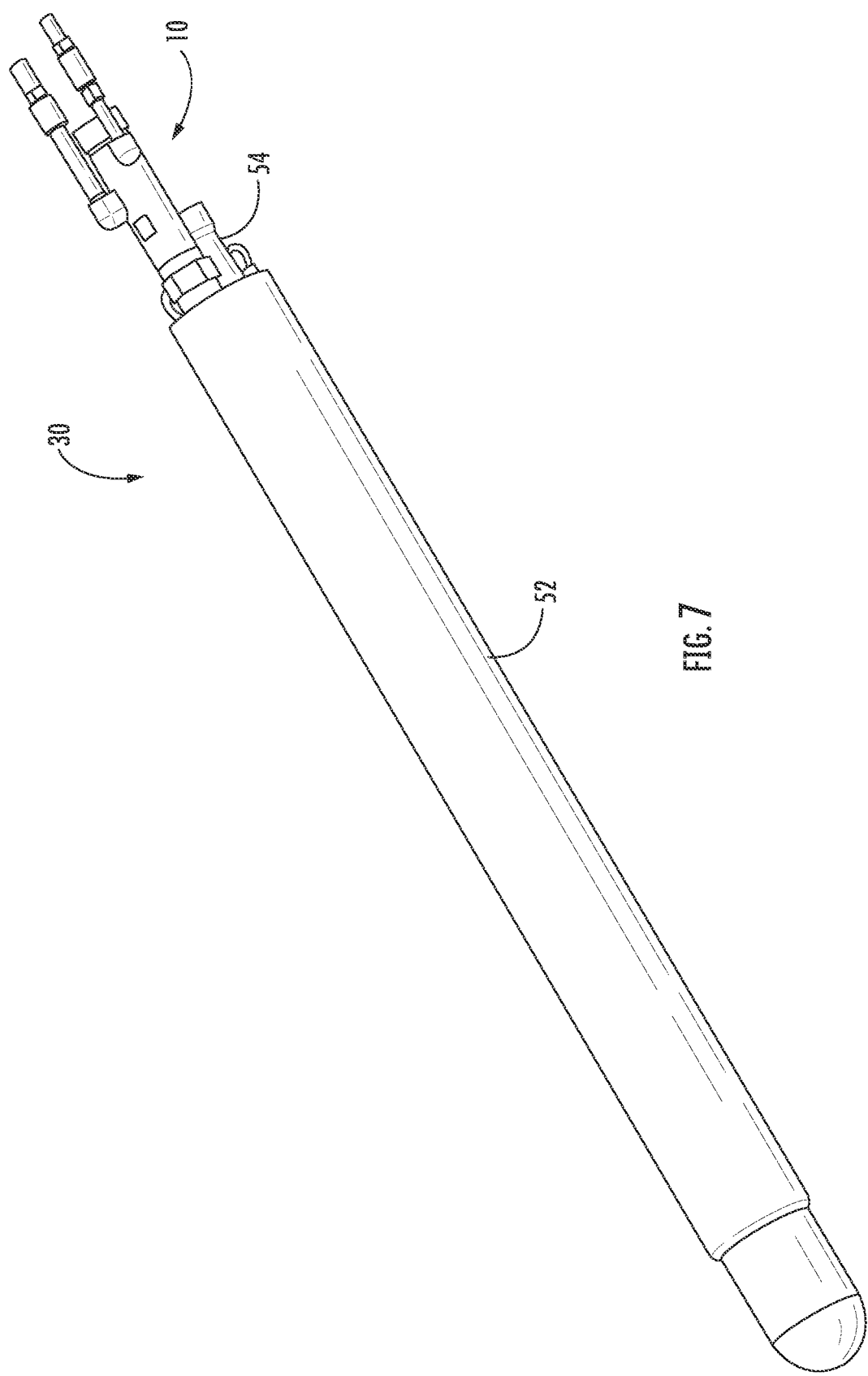
FIGS. 7-9 show a pump with the multi-function valve of FIG. 1 connected thereto.
Figure 8:
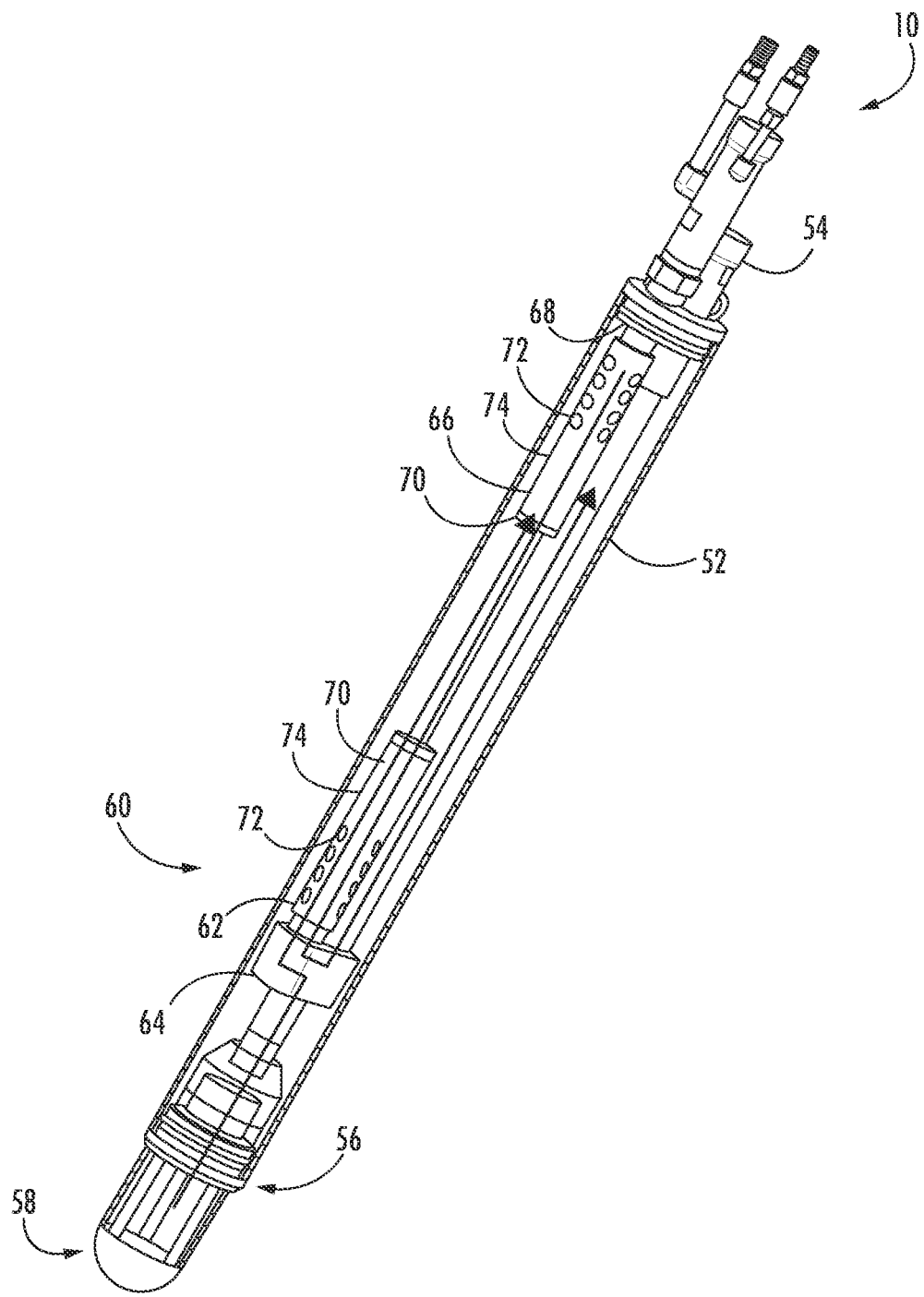
Figure 9:
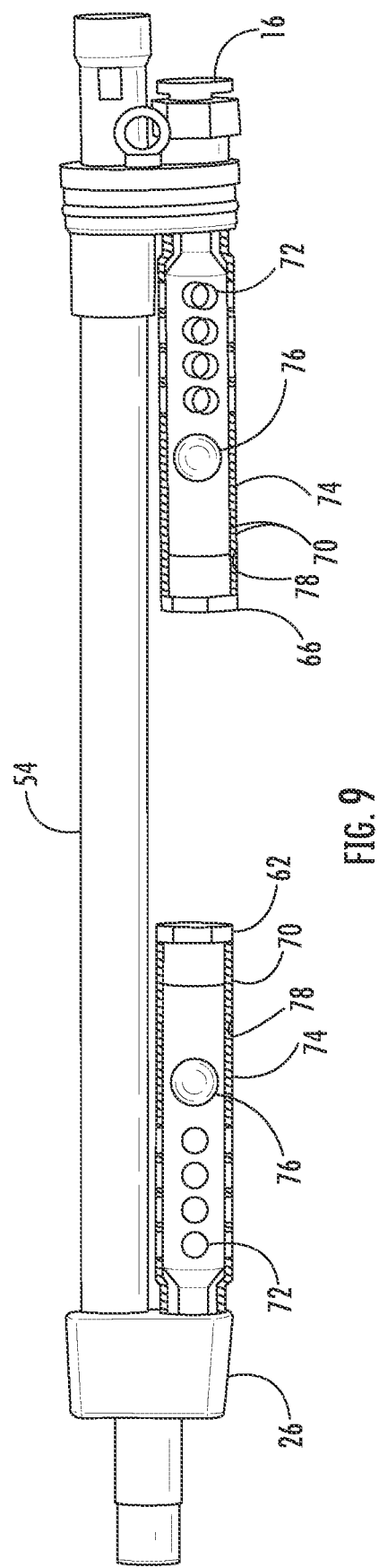

Referring now to FIGS. 7-9, the multi-function valve 10 is shown connected to a top 50 of pump 30. Pump 30 includes an outer pump casing 52 housing a discharge tube 54 operably connected to a check valve 56 disposed in a bottom 58 of the pump 30 and control float assembly 60. The check valve 56 includes a ball-end float that, in an unseated position, allows leachate from a well to enter the pump casing 52 and, in a seated position, prevents leachate from being discharged back into the well.

Figure 10:
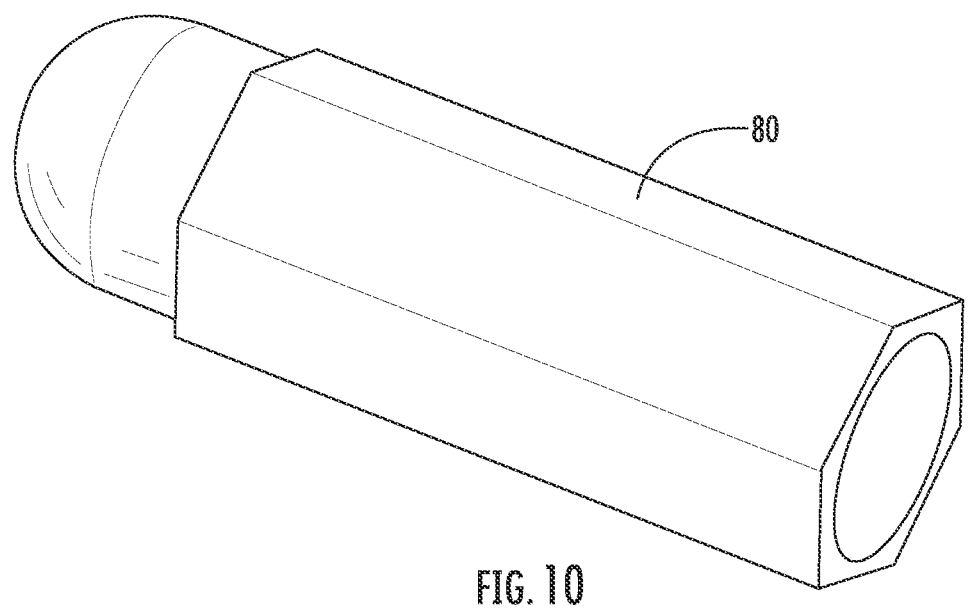
FIG. 10 shows a float for use with the pump of FIGS. 7-9.
Figure 11:
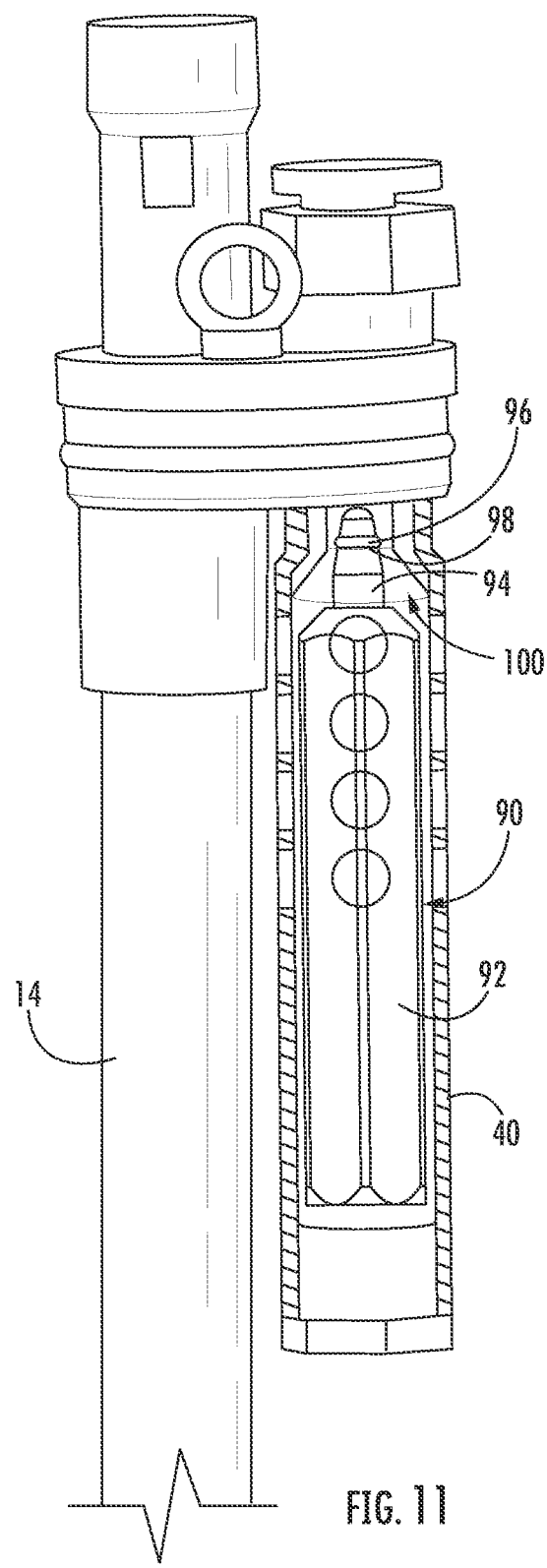
FIG. 11 shows a float for use with the pump of FIGS. 7-9.

The control float assembly includes a bottom float check valve 62 connected to a lower coupling 64 and an upper float check valve 66 connected to an upper air/vent port 68. The coupling 64 coupling the bottom float check valve 62 and discharge tube 54 together via an internal flow passage. Each of the float check valves 62 and 66 include a housing 70 having a plurality of apertures 72 formed through a wall 74 of the housing 70. A ball-end float 76 is contained in a bore 78 of the housing 70, the ball-end float 76 being movable between a seated position and an unseated position. Bottom and upper float check valves 62 and 66 may also use a shuttle 80, FIG. 10, instead of ball-end floats 76. Additionally, as shown in FIG. 11, the bottom and upper float check valves 24 and 28 may use float 90 instead of ball-end floats 36 and 46. As shown, float 90 includes a body portion 92 and a tip portion 94 having an O-ring seal 96 disposed in a groove 98 therearound. Tip portion 94 is narrower than the body portion 92 and is configured for mating engagement with a seat 100 of housings 30 and 40. It should be appreciated that the bottom and upper float check valves 24 and 28 may include any combination of floats. For example, the bottom check valve my use ball-end float 36 and upper float check valve may use float 90.

In operation, multi-function valve 10 enters the normally open state by moving the spool valve 22 and opening the vent 16, check valve 56 unseats and allows the leachate to enter into the coupling 64 and into the pump casing 52. The leachate flows into the pump casing 52 via the apertures 72 of the bottom float check valve 66. As the leachate level rises, the ball-end float 76 of the bottom float check valve 66 moves from a seated position to an unseated position by floating up into the housing 70, thereby allowing the leachate to continue to flow into the pump case 52.

As the leachate reaches the upper float check valve 66, ball-end float 76 of the upper float check valve 66 begins to move from an unseated position towards a seated position at a top of the housing 70. Once ball-end float 76 reaches a top of the housing 70, the ball-end float 76 seals off the upper air/vent port 68 preventing leachate from entering air and vent lines as well as causing the leachate to stop flowing into the pump casing 52, at which time the pump is full with leachate and ready to be cycled and pumped out. In the normally off or actuated state, the spool valve 22 moves or shuttles under the command pressure from pilot air pressure 18 acting against piston end 32 which closes the vent 16 and opens the air inlet 14. The air inlet 14 pushes compressed air into the pump casing 52 through the check valve 24, the upper float check valve 66 unseating the ball-end float 76, causing the leachate to move through the bottom float check valve 62, through the coupling 64 and out the discharge tube 54.

As the leachate is pushed out the discharge tube 54, the ball 76 of the bottom float check valve 62 begins to move from an unseated position to a seated position. Once the ball 76 is seated, the multi-function valve 10 can be commanded to return to the normally open state and opens the vent 16 to allow more leachate to enter the pump casing 52. This arrangement keeps the pump from discharging when no leachate is in the pump, overrides the controller apparatus 46 connected to the pump, and prevents air from entering the discharge tube.

The foregoing has described a pump, multi-function valve, and controller apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A pump assembly, comprising:
   a pump having an outer casing having a first end, an opposing second end, and a cavity therein, the pump further including:
   a discharge tube positioned in the cavity and exiting the first end of the outer casing;
   a check valve positioned in the cavity and operably connected to the discharge tube by a coupling; and
   a multi-float control assembly positioned in the cavity, the multi float control assembly including a bottom float check valve operably connected to the discharge tube by the coupling and an upper float check valve connected to a vent exiting the first end of the outer casing; and
   a multi-function valve connected to the first end of the pump.

2. The pump assembly of claim 1, wherein the multi-function valve includes:
   a housing having an internal bore therein;
   a spool valve positioned in the internal bore, the spool valve configured to seal and direct a flow of compressed air and exhaust; and
   a spring operably connected to the spool valve, the spring biasing the spool valve in a normally open exhausting position.

3. The pump assembly of claim 2, wherein the multi-function valve further includes a check valve positioned in the internal bore at an anterior end of the spool valve, the check valve preventing contaminates from flowing through a compressed air exit of the spool valve.

4. The pump assembly of claim 3, wherein the multi-function valve further includes:
   a compressed supply air inlet connected to the housing;
   a vent connected to the housing; and
   a compressed pilot air inlet connected to the housing.

5. The pump assembly of claim 1, further including a controller apparatus, the controller apparatus operates the pump under a pre-determined control scheme by controlling compressed air supply and exhaust functions of the multi-function valve.

6. The pump assembly of claim 5, wherein the controller apparatus includes:
an air input connected to a solenoid;
an exhaust and air output connected to the solenoid;
a timer to set the pre-determined control scheme by turning the solenoid on and off at pre-determined times; and
a battery to power the controller apparatus.

7. The pump assembly of claim 6, wherein the air input is connected to a supply of air via a counter to supply air to the pump.

8. A pump assembly, comprising:
a pump having an outer casing having a first end, an opposing second end, and a cavity therein, the pump further including:
a discharge tube positioned in the cavity and exiting the first end of the outer casing;
a check valve positioned in the cavity and operably connected to the discharge tube by a coupling; and
a multi-float control assembly positioned in the cavity, the multi float control assembly including a bottom float check valve operably connected to the discharge tube by the coupling and an upper float check valve connected to a vent exiting the first end of the outer casing; and
a controller apparatus connected to the pump, the controller apparatus operating the pump under a pre-determined control scheme.

9. The pump assembly of claim 8, wherein the check valve is positioned at the second end of the casing and is operably connected to the discharge tube and bottom float check valve by an internal flow passage in the coupling.

10. The pump assembly of claim 9, wherein the check valve includes a ball float that moves between a seated and unseated position, wherein in the unseated position, fluid is permitted to enter the bore of the outer casing.

11. The pump assembly of claim 8, wherein the bottom float check valve and the upper float check valve each include a housing having a plurality of apertures formed through a wall of the housing.

12. The pump assembly of claim 11, wherein the bottom float check valve further includes a float contained in a bore of the housing, the float being moveable between a seated position and unseated position, and wherein the upper float check valve further includes a float contained in a bore of the housing, the float being moveable between a seated position and unseated position.

13. The pump assembly of claim 8, wherein the controller apparatus includes a solenoid connected to an air input, an exhaust, an air output, and a timer, the timer implementing the pre-determined control scheme by turning the solenoid on and off.

14. The pump assembly of claim 8, further including a multi-function valve, the multi-function valve being connected to the first end of the pump and includes:
a housing having an internal bore therein;
a spool valve positioned in the internal bore, the spool valve configured to seal and direct a flow of compressed air and exhaust;
a spring operably connected to the spool valve, the spring biasing the spool valve in a normally open exhausting position; and
a check valve positioned in the internal bore at an anterior end of the spool valve, the check valve preventing contaminates from flowing through a compressed air exit of the spool valve.

15. The pump assembly of claim 14, wherein the controller apparatus includes a solenoid connected to an air input, an exhaust, an air output, and a timer, the timer implementing the pre-determined control scheme by turning the solenoid on and off to provide the multi-function valve a compressed supply air.

16. The pump assembly of claim 15, further comprising:
a compressed supply air inlet connected to the housing configured to receive the supply of air from the control apparatus;
a vent connected to the housing; and
a compressed pilot air inlet connected to the housing.

17. The pump assembly of claim 16, wherein the spool valve includes a first end and an opposing second end, the first end having an area greater than an area of the second end.

18. The pump assembly of claim 17, wherein compressed supply air is supplied to the first end of the spool valve to move the spool valve from a normally open state where exhaust is vented from the pump to a normally off state where the vent is closed and fluid is discharged through the discharge tube.

* * * * *